United States Patent
Kuo et al.

(10) Patent No.: US 6,229,670 B1
(45) Date of Patent: May 8, 2001

(54) LASER TEXTURING OF A MAGNETIC DISK MEDIA TO CREATE A CONTACT ZONE OF RIDGE SECTIONS SPACED A GREATER RADIAL DISTANCE APART THAN THE WIDTH OF THE RIDGE SECTION

(75) Inventors: David S. Kuo, Palo Alto; Wei H. Yao; Ramesh Sundaram, both of Fremont, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/381,079
(22) PCT Filed: Mar. 13, 1998
(86) PCT No.: PCT/US98/05283
    § 371 Date: Jan. 14, 2000
    § 102(e) Date: Jan. 14, 2000
(87) PCT Pub. No.: WO98/40879
    PCT Pub. Date: Sep. 17, 1998

Related U.S. Application Data
(60) Provisional application No. 60/040,788, filed on Mar. 4, 1997.

(51) Int. Cl.$^7$ .......................................................... G11B 5/82
(52) U.S. Cl. ................................................................ 360/135
(58) Field of Search ...................................... 360/133, 135

(56) References Cited

U.S. PATENT DOCUMENTS

| | | | | |
|---|---|---|---|---|
| 3,772,081 | * | 11/1973 | Franer | 360/135 |
| 5,635,269 | * | 6/1997 | Weir | 360/135 |
| 6,103,404 | * | 8/2000 | Ross | 360/135 |

* cited by examiner

Primary Examiner—A. J. Heinz
(74) Attorney, Agent, or Firm—Larkin, Hoffman, Daly & Lindgren, Ltd.; Frederick W. Niebuhr, Esq.

(57) ABSTRACT

A magnetic data storage medium includes a dedicated transducing head contact zone for engaging an air bearing slider, primarily when the disk is stationary. The contact zone is textured with at least one elongate ridge extending in the circumferential direction. When a single ridge is formed, it runs in a spiral path in multiple turns with a predetermined radial pitch at least ten times the nominal ridge width. The ridge protrudes axially outward from a nominal surface plane of the contact zone, and is rounded and free of sharp edges. The ridge, or plurality of ridge sections, can be formed by a texturing process that includes directing a laser beam, focused, onto the contact zone surface. While the disk is rotated to maintain a constant circumferential speed relative to the laser, it also is translated radially to provide the desired radial pitch. The laser is operated in a CW (continuous wave) mode, to create a more uniform ridge.

32 Claims, 7 Drawing Sheets

LASER TEXTURING OF A MAGNETIC DISK MEDIA TO CREATE A CONTACT ZONE OF RIDGE SECTIONS SPACED A GREATER RADIAL DISTANCE APART THAN THE WIDTH OF THE RIDGE SECTION

This application claims the benefit of Provisional Application No. 60/040,788 entitled "Continuous Spiral Line Laser Texture to Improve Take-off and Landing Dynamics of Laser Texture", filed Mar. 14, 1997.

BACKGROUND OF THE INVENTION

The present invention relates to texturing of magnetic data storage media, and more particularly to the texturing of dedicated transducing head contact zones of such media to minimize system resonance.

Laser texturing of magnetic disks, particularly over areas designed for contact with data transducing heads, is known to reduce friction and improve wear characteristics as compared to mechanically textured disks. Traditional laser texturing involves focusing a laser beam onto a disk substrate surface at multiple locations, forming at each location a depression surrounded by a raised rim as disclosed in U.S. Pat. No. 5,062,021 (Ranjan) and U.S. Pat. No. 5,108,781 (Ranjan). An alternative, as disclosed in International Publications No. WO 97/07931 and No. WO 97/43079, is to use a laser beam to form domes or nodules, rather than rims. In some cases, each of the domes is surrounded by a raised rim. The features can be axisymetric, i.e. with circular profiles, or can have non-axisymetric or elliptical profiles. In the latter case, the long axes of the texturing features preferably extend circumferentially relative to the disk.

Collectively, the texturing features are formed in a desired pattern or distribution throughout the head contact zone. A particularly preferred pattern is a spiral, formed by rotating the disk at a desired angular speed while at the same time moving a laser radially with respect to the disk. The laser is pulsed to form the individual texturing features. For example, the disk can be rotated at a speed, variable depending on the radial position of the laser, to provide a linear (arcuate) velocity of about one meter per second. Then, operating the laser at 50,000 pulses per second would provide a 20 micron circumferential pitch, i.e. distance between adjacent texturing features. The radial speed of the laser module controls the radial pitch or spacing between adjacent turns of the spiral, which also can be about 20 microns.

Although this approach has been highly successful in terms of reducing dynamic friction and improving the wear characteristics of dedicated transducing head contact zones, the regular, repeating pattern of the laser texture features produces strong input excitations based on the fundamental frequency of the circumferential pitch, including higher order harmonics. When the excitation frequencies coincide with natural frequencies of the slider or its gimbal and support system, resonance occurs which results in a high amplitude acoustic emission signal, which can increase the difficulty of determining the glide avalanche breaking point (a disk/transducing head spacing value), and yield a false indication that the disk has failed a glide test.

Apart from their contribution to resonance, the regularly spaced apart texturing features are thought to contribute to transducing head disturbances in two further respects. First, an intermittent contact of the peaks of texturing features with the data transducing head during disk accelerations and decelerations can disturb the head. Second, the texturing features contribute to turbulence in the air bearing that supports the transducing head slider during portions of accelerations and decelerations.

Therefore, it is an object of the present invention to provide a texturing feature adapted to impart a desired surface roughness to the dedicated transducing head contact zone of a recording medium while minimizing undesirable resonant frequency effects.

Another object is to provide a magnetic data storage medium in which a head contact zone has a topography that is directionally controlled, in that surface height gradients occur primarily in the direction perpendicular to the direction of transducing head travel relative to the disk.

A further object is to provide a process for laser texturing a data storage medium to form texturizing features that are elongate and highly uniform in the direction of storage media travel.

Yet another object is to provide magnetic data storage media that exhibit the highly favorable dynamic friction and wear characteristics of laser textured media, and further exhibit low resonance interactions with transducing heads during head take-offs and landings.

SUMMARY OF THE INVENTION

To achieve these and other objects, there is provided a magnetic data storage disk. The disk includes a substrate body formed of a non-magnetizable material and having a substantially planar surface including an annular contact region. The contact region is adapted for surface engagement with a magnetic data transducing head during accelerations and decelerations of the substrate in a circumferential direction with respect to the transducing head. A plurality of elongate ridge sections extend substantially circumferentially along the contact region. Each of the ridge sections has a circumferential length, a width in the radial direction, and an axial height above a nominal surface plane of the contact region. Each ridge section is substantially uniform in height over substantially its entire length. Each ridge section is convex in the direction away from the nominal surface plane. Adjacent ridge sections are spaced radially apart from one another by a radial pitch at least ten times the radial ridge section widths. The ridge sections have substantially the same height, and thus cooperate to determine a substantially uniform surface roughness throughout the contact zone.

There are several suitable arrangements of the ridge sections. In one highly preferred arrangement, the ridge sections are part of and cooperate to form a single, continuous spiral-line textured pattern. In this case, each complete turn or revolution of the spiral is conveniently considered as one of the ridge sections. The spiral pattern is favored, since it involves a single, continuous path that facilitates a complete laser texturing of the contact region in a matter of seconds. Disk rotation and radial travel are coordinated to maintain a substantially uniform radial pitch.

Alternatively, the ridge section can be formed as a series of concentric rings. In this case, the radial position of the laser module is kept constant during each revolution, and between revolutions is stepped by an amount that determines the radial pitch.

The profile of the ridge sections is preferably uniform, and is primarily a function of the impingement energy of the laser beam at the disk surface. Impingement energy, in turn, depends on a combination of factors including laser power, the degree of attenuation if any, and degree of focus of the laser beam, and the mode in which the laser is operated. For example, in the $TEM_{00}$ mode, the power distribution is Gaussian, concentrating more energy toward the center of the beam.

Preferably the ridge sections have a height in the range of 5–30 nm, more preferably in the range of 5–20 nm. The widths of the ridges are substantially greater than the height, typically at least one micron and more preferably at least two microns.

The substrate body typically is formed of aluminum, with a nickel phosphorous layer plated over the aluminum. Subsequent films or layers applied over the Ni—P layer include a non-magnetizable underlayer, a magnetizable thin film recording layer, and a protective carbon layer. Preferably the ridge sections are formed in the nickel phosphorous layer. Then, the underlayer, recording layer and cover layer, being of uniform thickness, replicate the substrate topography including the texturing throughout the contact zone. Alternatively, the ridge sections can be formed in either the underlayer or the thin film recording layer.

Further according to the invention, there is provided a process for surface texturing a magnetic data storage medium, including the following steps:

a. directing a coherent energy beam toward a magnetic data storage medium, to cause the coherent energy beam to impinge upon a selected surface of the storage medium at an impingement area thereon, wherein the selected surface has a nominal surface defines a nominal surface plane; and b. translating the data storage medium with respect to the coherent energy beam in a manner to cause the impingement area to move along the selected surface in a predetermined direction at a substantially constant speed relative to the data storage medium along a path, momentarily and locally melting the data storage medium at the selected surface and along the path, to form a continuous, elongate ridge along the path in said predetermined direction, extending outwardly away from the nominal surface plane, and having a substantially uniform height in the range of about five to about 30 nm, wherein the elongate ridge is rounded and substantially free of sharp edges.

Typically the data storage medium is disk shaped, and the impingement area is moved at least in part by rotating the disk, thus to define a substantially circumferential path. The coherent energy beam is translated radially with respect to the disk, simultaneously with disk rotation. The result is a spiral path, with the rotational and radial movement coordinated to yield a uniform radial pitch. The laser is operated in the CW (continuous wave) mode.

Because they are considerably more elongate than the conventional bumps or domes, the ridges and ridge sections enable operation of the laser in the CW mode. While a single, continuous ridge formed in a spiral path perhaps is the best example for demonstrating this advantage, the concentric ring ridge sections provide the advantage as well. Even a short circular ridge, e.g., with a circumferential length of about 10 mm, has a length greater than the characteristic ridge width (approximately 3 microns) by at least three orders of magnitude. The primary benefit of operating the laser in the CW mode is that the power output remains stable over time, meaning that the level of energy at the impingement area likewise is highly stable. Any adjustments to that energy level, whether through changing the laser power or the optical components between the laser source and the disk, are gradual changes in the nature of fine tuning, rather than the abrupt fluctuations inherent in pulsed energy. This simplifies the texturizing process, and affords a greater degree of control over the size and profile of the ridge.

In this regard, a key feature is the ability to maintain a uniform height over substantially the entire length of each ridge section, and more generally throughout all of the ridge sections forming the dedicated contact zone. This provides an excellent degree of control over the contact zone surface roughness, in terms of peak height above the nominal surface plane.

With respect to resonance, the orientation of the ridge sections and their elongation and uniformity provide a key advantage. More particularly, surface profiles taken in planes perpendicular to ridge extension are substantially uniform. In other words, there is virtually no topography gradient in the circumferential direction. The maximum topography gradient occurs in the radial direction.

When the data storage disk is rotationally accelerated and decelerated, to provide respectively for the take-off and landing of the aerodynamically supported head slider, the slider moves relative to the disk in the circumferential direction. Accordingly, the slider encounters virtually no topography gradient, and there is virtually no input excitation frequency (harmonics) to coincide with and amplify natural resonant frequencies of the slider or its support system. As a result, glide avalanche measurements are improved, particularly measurements of glide avalanche breaking point (GABP), reducing the number of disks with satisfactory textures that nonetheless fail glide tests, solely due to resonance effects.

IN THE DRAWINGS

For a further appreciation of the above and other features and advantages, reference is made to the following detailed description and to the drawings, in which.

DETAILED DESCRIPTION OF THE PREFERRED EMBODIMENTS

Figure 1:
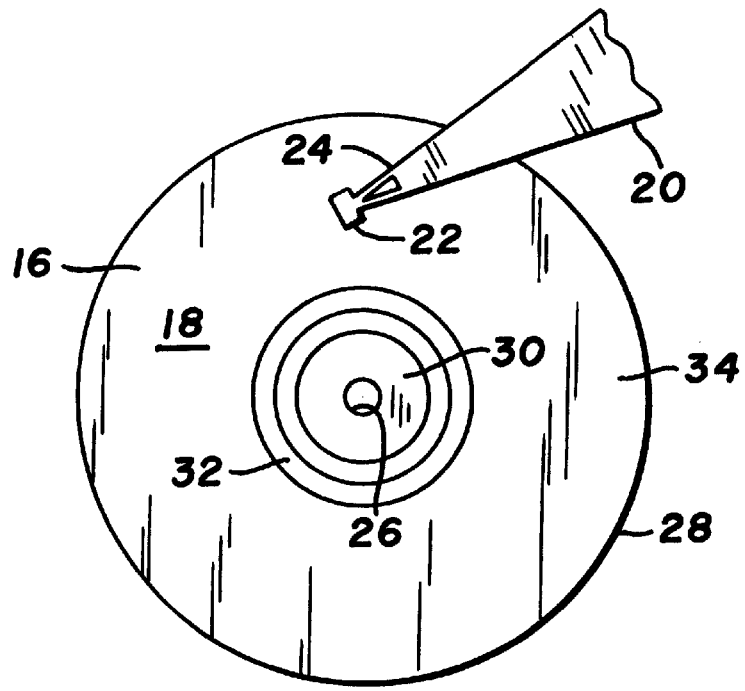
FIG. 1 is a plan view of a magnetic data storage disk and a data transducing head supported for generally radial movement relative to the disk.
Figure 2:
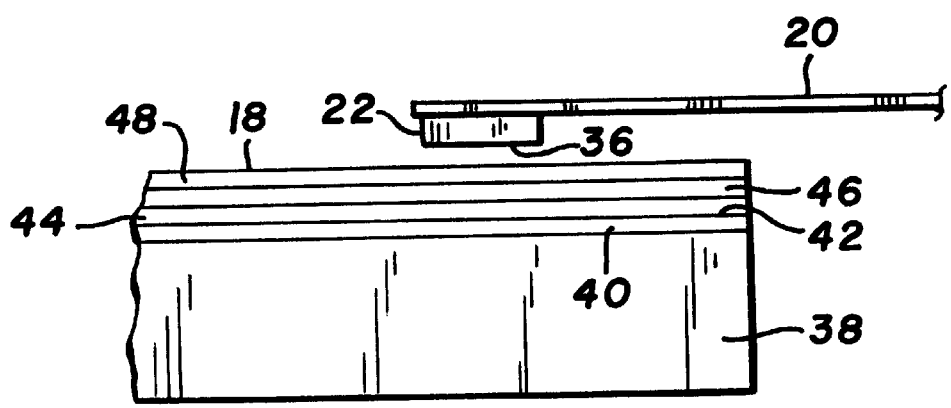
FIG. 2 is an enlarged partial sectional view of the magnetic disk in FIG. 1.
Figure 3:
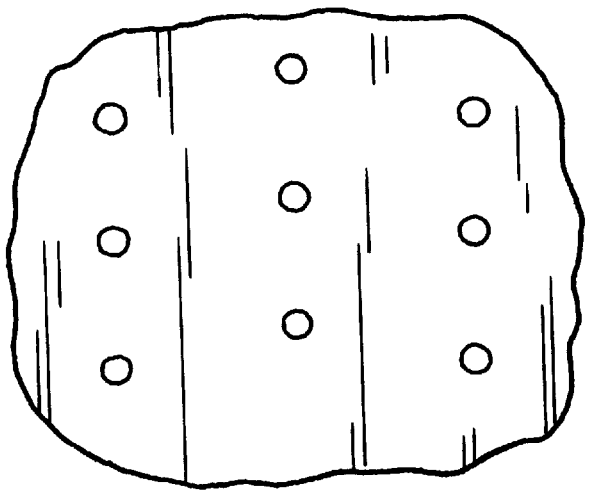
FIG. 3 is a partial top plan view of a magnetic data storage disk with a texture pattern of discrete nodules according to the traditional laser texturing approach.

Turning now to the drawings, there is shown in FIGS. 1 and 2 a medium for reading and recording magnetic data, in particular a magnetic disk 16 rotatable about a vertical axis and having a substantially planar horizontal upper surface 18. A rotary actuator (not shown) carries a transducing head support arm 20 in cantilevered fashion. A magnetic data transducing head 22 (including magnetic transducer and air bearing slider) is mounted to the free end of the support arm, through a suspension 24 which allows gimballing action of the head, i.e., limited vertical travel and rotation about pitch and roll axes. The rotary actuator and the support arm pivot to move head 22 in an arcuate path, generally radially with respect to the disk.

At the center of disk 22 is an opening to accommodate a disk drive spindle 26 used to rotate the disk. Between the opening and an outer circumferential edge 28 of the disk, upper surface 18 is divided into three annular regions or zones: a radially inward zone 30 used for clamping the disk to the spindle; a dedicated transducing head contact zone 32; and a data storage zone 34 that serves as the area for recording and reading the magnetic data.

When the disk is at rest, or rotating at a speed substantially below its normal operating range, head 22 contacts upper surface 18. When the disk rotates at higher speeds, including normal operating range, an air bearing or cushion is formed by air flowing between the head and upper surface 18 in the direction of disk rotation. The air bearing supports the head above the upper surface. Typically the distance between a planar bottom surface 36 of head 22 and upper surface 18, known as the head "flying height," is about 10 microinches (254 nm) or less. Lower flying heights permit a higher density storage of data.

For data recording and reading operations, rotation of the disk and pivoting of the support arm are controlled in concert to selectively position transducing head 22 near desired locations within data zone 34. Following a data operation, the disk is decelerated and support arm 20 is moved radially inward toward contact zone 32. By the time the disk decelerates sufficiently to allow head/disk contact, the head is positioned over the contact zone. Thus, head contact with other regions of the disk surface is avoided. Before the next data operation, the disk is accelerated, initially with head 22 engaged with disk 16 within the contact zone. Support arm 20 is not pivoted until the head is supported by an air bearing, above the contact zone.

Magnetic disk 16 is formed by mechanically finishing an aluminum substrate disk 38 to provide a substantially flat upper surface. Typically a nickel-phosphorous alloy has been plated onto the upper surface of the substrate disk, to provide a non-magnetizable layer 40 with a uniform thickness in the range of about 2–12 microns. Following plating, the exposed upper surface 42 of the Ni—P alloy layer is polished to a roughness of about 0.1 micro inch (2.54 nm) or less.

After mechanical finishing, substrate surface 42, at least along contact zone 32, is laser textured to provide a desired surface roughness. Laser texturing involves melting the substrate disk at and near surface 42, forming texturing features as will be described in greater detail below.

Fabrication of disk 16 involves the application of several layers after texturing. The first of these is a chrome underlayer 44 with a typical thickness of about 10–100 nm. Next is a magnetic thin film recording layer 46, where the data are stored, typically at a thickness of about 10–50 nm. The final layer is a protective carbon layer 48, in the range of 5–30 nm in thickness. Layers 44, 46 and 48 are substantially uniform in thickness, and thus replicate the texture of substrate surface 42.

Figure 4:
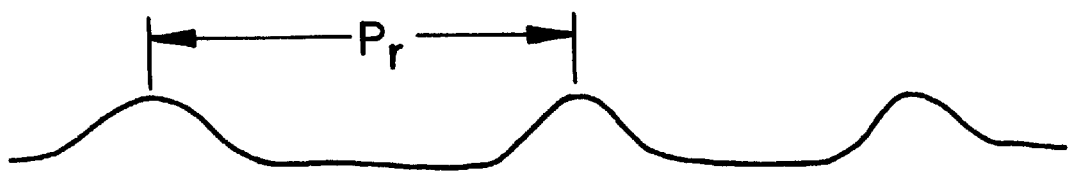
FIG. 4 is a schematic representation of a surface profile of the contact zone in FIG. 3, taken in a radial direction.
Figure 5:
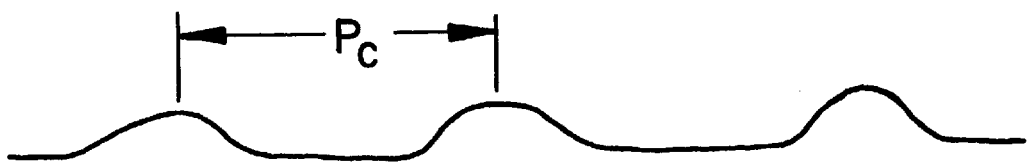
FIG. 5 is a schematic surface profile of the contact zone in FIG. 3, taken in a circumferential direction.

As previously mentioned, traditional laser texturing involves forming discrete nodules (also called bumps or domes) in the substrate disk at surface 42. The size and shape of the nodules depends on the level of laser beam energy impinging upon surface 42. Typically the nodules are formed in a spiral path, having a circumferential pitch governed by the disk rotational speed and laser pulsing interval during texturing. A radial pitch, i.e., the radial distance between consecutive turns of the spiral path, is determined by disk rotation and the rate of radial shifting of the laser relative to the disk. The surface profile views in FIGS. 4 and 5 illustrate radial pitch and circumferential pitch, respectively.

Figure 6:
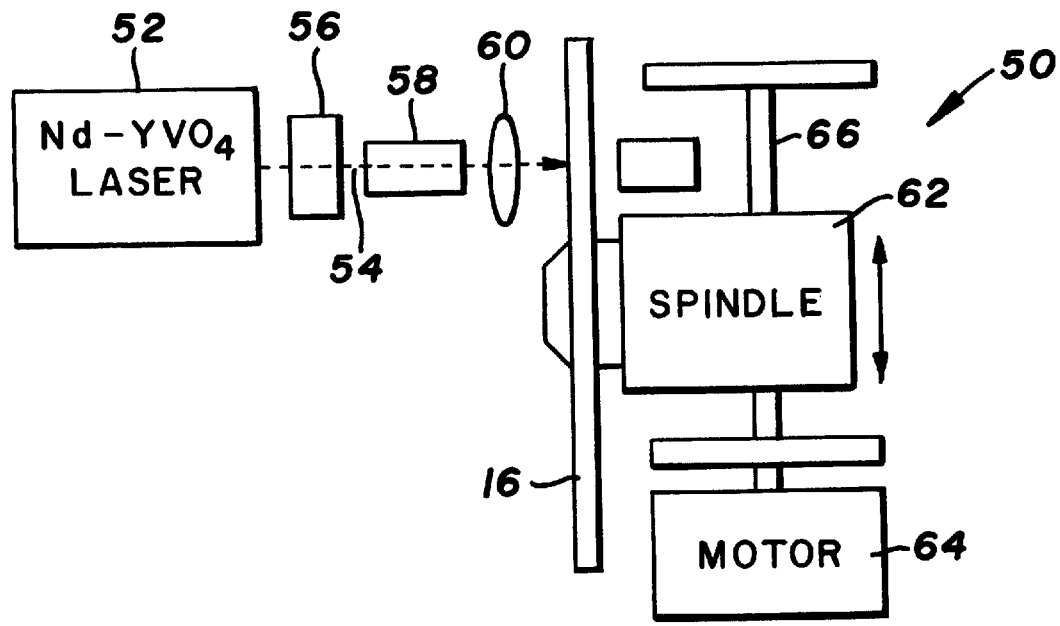
FIG. 6 is a diagrammatic view of a texturing device for forming the elongate texturing features of the disk in FIGS. 1 and 2.

FIG. 6 shows a laser texturing device 50 for forming laser textured features in accordance with the present invention. Device 50 includes a neodynium: yttrium vanadium oxide (Nd:=YVO$_4$) diode laser 52, and beam expanding and collimating optics to produce a beam 54 in the form of a circular cylinder, the diameter of which varies with the application and optical components involved. The optical components include a variable beam attenuator 56, a beam expander 58 and a lens 60 for focusing the beam onto surface 42 of the disk. Attenuator 56 can be a neutral density filter, e.g., a glass plate bearing a film applied by sputtering unevenly to provide a transmissivity gradient through the plate.

As explained in the aforementioned U.S. Pat. No. 5,062,021 and Publication WO 97/07931, the focusing of laser energy onto the metallic surface of the substrate disk causes highly localized melting at the surface. Although the material resolidifies rapidly, there is sufficient material flow to form a nodule which projects outwardly, or in the case of a horizontal surface projects upwardly, from the nominal surface plane.

The desired texturing pattern and features are formed by rotating disk 16 using a spindle 62, and by radially translating the disk relative to the laser beam, e.g., by a motor 64 rotating a shaft 66 to move a non-rotating portion of spindle 62 upwardly and downwardly as viewed in the figure.

To trace the preferred spiral path, disk rotation and radial translation occur simultaneously. A substantial departure from previous systems resides in the fact that laser 52 is operated in the CW (continuous wave) mode during texturing. As a result, a single, continuous ridge is formed on surface 42 along the spiral path.

Figure 7:
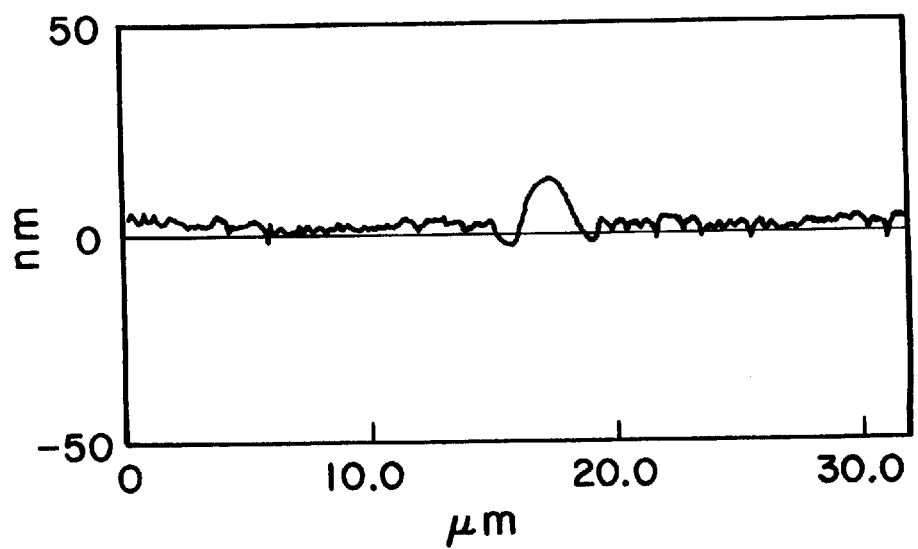
FIG. 7 is a chart showing an AFM surface profile of a ridge.

FIG. 7 is a chart showing an AMF (atomic force microscopy) profile of surface 42, where the ridge, indicated at 68, is shown in a profile taken on a radial plane perpendicular to the surface. The vertical scale is in nm, and the horizontal scale is in microns. Ridge 68 has a round, upwardly convex profile with a peak height of about 15–20 nm, and a width at its base of about 3 microns. The width can vary within a range of 1–5 microns. The height can vary within a range of about 5–30 nm, and more preferably 5–10 nm. The height is the more critical parameter, since the height throughout the ridge determines the surface roughness of the contact zone. The finer lines on opposite sides of ridge 68 illustrate the more acicular character of the mechanically finished disk surface.

Figure 8:
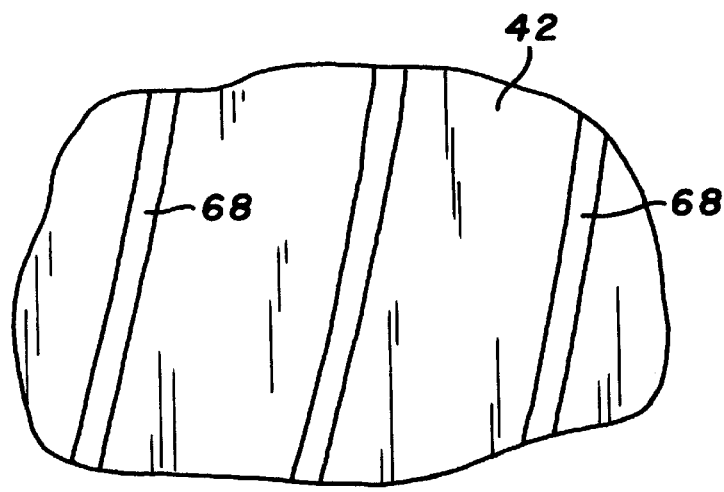
FIG. 8 is a plan view similar to that in FIG. 3, showing a transducing head landing zone textured in accordance with the present invention.
Figure 9:
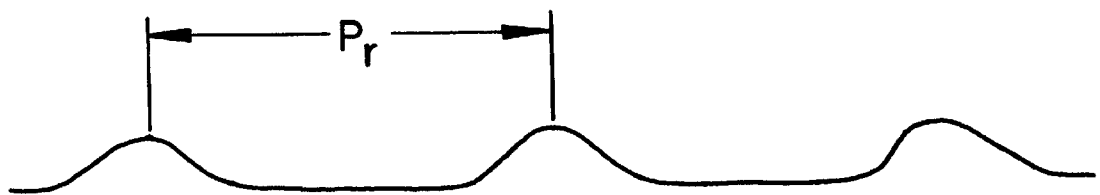
FIG. 9 is a schematic representation of a surface profile of the contact zone in FIG. 8, taken in a radial direction.

FIG. 8 is a top view showing part of contact zone 32 of disk 16, showing consecutive turns or ridge sections 68a, 68b and 68c of the ridge. The radial pitch, as seen in FIG. 9, is 50 microns. Ridge Sections 68a–c are highly uniform in surface profile due to their formation as parts of a continuous texturing operation during which the parameters that control intensity at the beam impingement area, and the rate of impingement area travel relative to the disk, are controlled to keep the intensity and speed substantially constant. The radial pitch can vary, but in general it is preferred to provide a radial pitch at least ten times the ridge width. Larger radial pitch values that still yield satisfactory performance are preferred, because the spiral ridge can be formed more rapidly. Further, it has been found that unduly high density of nodules or bumps adversely affects stiction performance, and density in terms of close radial spacing between adjacent ridge sections may have the same undesirable result.

Figure 10:
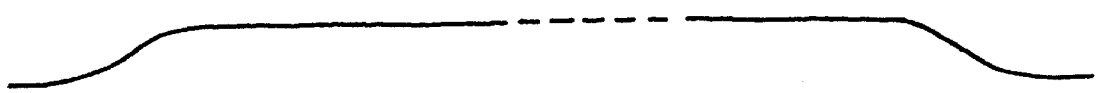
FIG. 10 is a surface profile of the landing zone in FIG. 8, taken in a circumferential direction.

FIG. 10 schematically represents the profile of ridge 68 along the entire spiral path, which includes multiple turns or ridge sections to provide a contact zone with a radial dimension sufficient to accommodate transducing head 22. Because laser 52 is operated in the CW mode, and because the linear (circumferential) velocity of disk 16 relative to the laser beam can be precisely controlled, the resulting ridge has a high consistency throughout its entire length, both in height and in transverse (radial) profile. The consistency in height is beneficial from the standpoint that ridge 68 determines a uniform surface roughness throughout the contact zone. More important, however, is the orientation of ridge 68, which imparts a highly directional quality to the topography of the contact zone. More particularly, maximum gradients in the height of the textured surface occur in the radial direction (e.g., FIG. 9), while in the circumferential direction there are virtually no height gradients.

Figure 11:
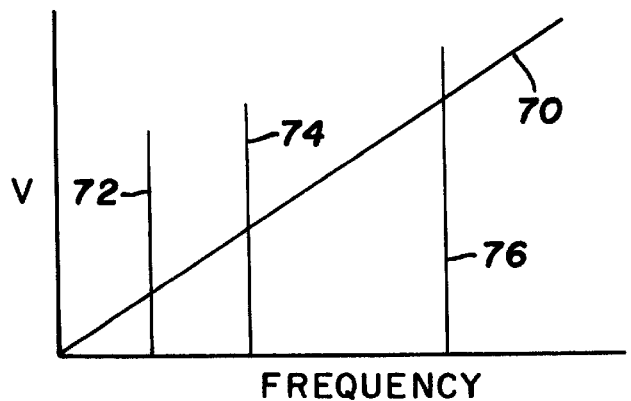
FIG. 11 is a chart illustrating the coincidence of an input excitation frequency with natural resonant frequencies of a transducing head slider and its support system.
Figure 12:
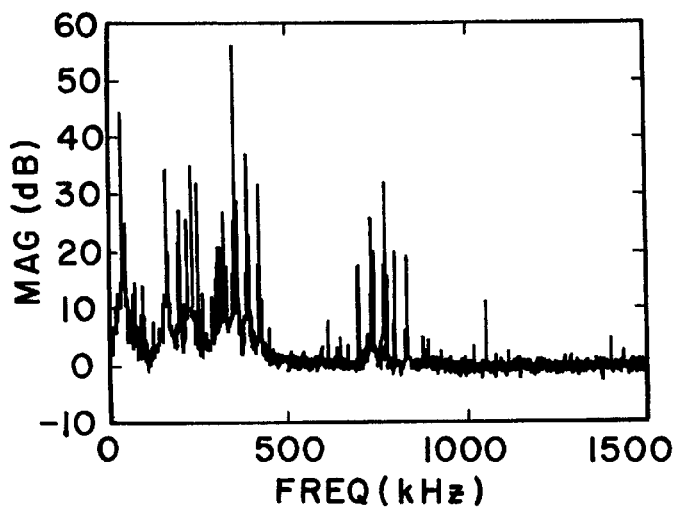
FIG. 12 is a chart showing the frequency response of a traditional laser texture during transducer slider take-off and landing.

The advantage of this result can be understood from FIG. 11, a plot of disk velocity (circumferential velocity) at a given radial location that has nodules formed by conventional laser texturing, i.e., with a uniform circumferential pitch. A line 70 illustrates the increase in input excitation frequency in linear relation to increases in disk speed. Several slider or slider support system resonant frequencies are indicated at 72, 74 and 76. At points where the input excitation frequency and its harmonics intersect the resonant frequencies, a strong resonant response results. FIG. 12 is a chart showing a frequency response of an array of patterned laser-formed nodules during head take-off and landing.

Figure 13:
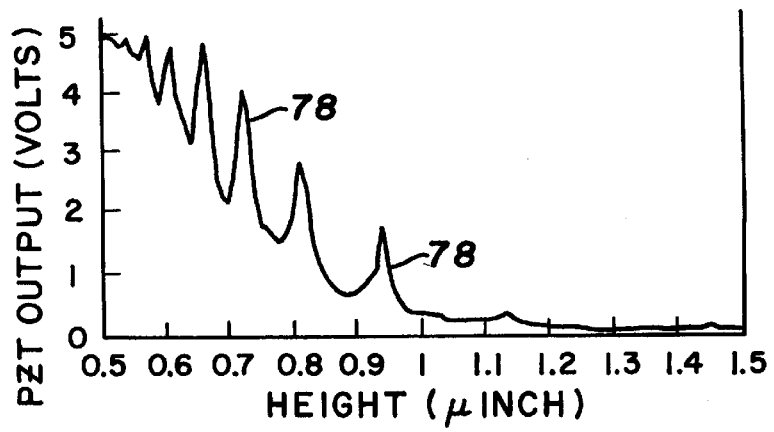
FIG. 13 is a chart showing a glide avalanche curve based on a traditional laser texture pattern.

FIG. 13 is a chart showing a glide avalanche curve for the disk, with spikes 78 indicating a match of the excitation frequencies (or harmonics) with natural frequencies of the air bearing. Resonance effects can cause an erroneous test result indicating failure of a disk. For example, if the threshold of the glide test were set to 1.5 volts, the disk under test would fail a 0.95 microinch glide test. Without the resonance effect the disk would pass the test.

Figure 14:
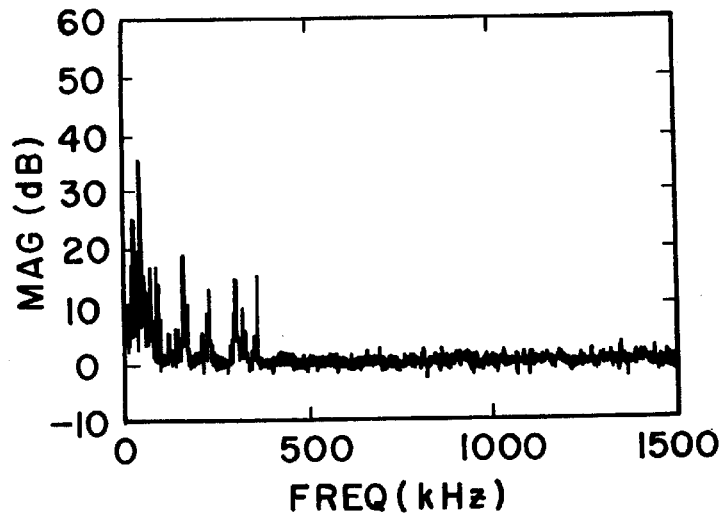
FIG. 14 is a chart showing the frequency response of a laser textured ridge in the form of a continuous spiral.

FIG. 14 is a chart similar to that in FIG. 12, but in contrast illustrates the frequency response of a texture pattern like ridge 68, i.e., a spiral-line laser texture, during head take-off and landing. Transducing head excitation is considerably reduced, particularly at high frequencies. A corresponding glide avalanche curve (not shown) would be smoother, and thus be more useful in assessing disk performance.

Figure 15:
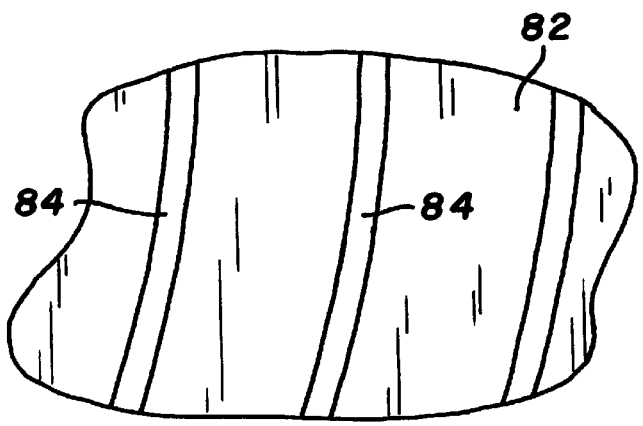
FIG. 15 is a partial top plan view of an alternative data storage disk textured according to the present invention.
Figure 16:
FIG. 16 is a sectional view of the disk in FIG. 15.

FIGS. 15 and 16 illustrate an alternative embodiment data storage medium, in particular a glass ceramic substrate 80 provided with a metallic layer 82, e.g., chromium, sputtered or otherwise deposited onto the glass substrate. The metallic layer is exposed to a CW laser beam while the substrate and metallic layer are rotated and translated radially, to form a ridge 84 along a spiral path substantially as previously described. To ensure that the topography is determined by ridge formation rather than by localized micro fracturing, metallic layer 82 should have a thickness of at least about 100 nm.

Figure 17:
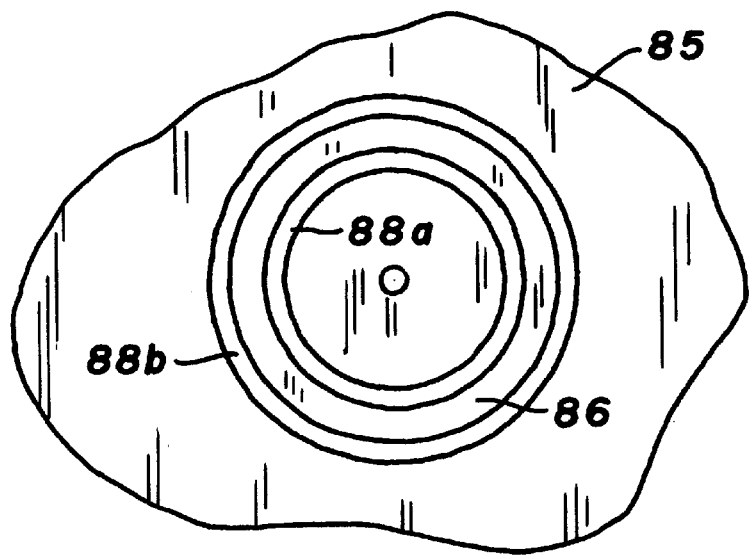
FIG. 17 is a schematic top view of a further alternative embodiment data storage disk.

FIG. 17 schematically illustrates a further alternative embodiment data storage disk 85, particularly a transducing head contact zone 86 of the disk. The laser texturing consists of a series of concentric rings 88a, 88b, etc. To form rings 88, device 50 steps disk 85 radially according to a predetermined radial pitch, then maintains a constant radius as the disk is rotated to form one of the rings.

Figure 18:
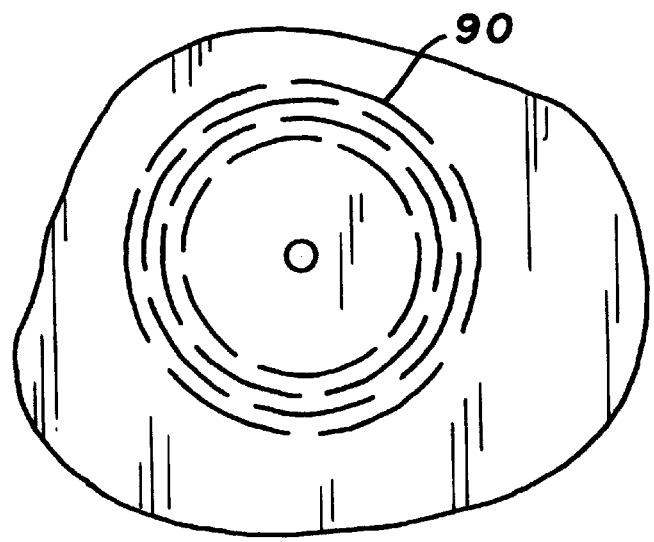
FIG. 18 is a schematic top view of yet another alternative embodiment data storage disk.

FIG. 18 illustrates yet another alternative embodiment data storage disk, having a contact zone 90 in which the texturing features are arcuate ridge segments, spaced radially apart from one another. Formation of these texturing features requires a stepping of the disk in the radial direction.

Thus, in accordance with the present invention, the transducing head contact zones of data storage disks are textured to provide an enhanced surface roughness that improves dynamic friction and wear, yet also eliminates the problem of input excitation frequencies that yield on duly high acoustic energy signals during the take-off and landing of the head slider. This result is achieved by providing a directional character to the topography, in particular virtually eliminating gradients in topography in the circumferential direction. The preferred features are circumferentially extending, elongate segments that can be formed separately from one another in circles or arc segments, or be combined in a single, continuous spiral ridge.

What is claimed is:

1. A magnetic data storage disk, comprising:

a substrate body formed of a non-magnetizable material and having a substantially planar surface including an annular contact region adapted for surface engagement with a magnetic data transducing head during accelerations and decelerations of the substrate in a circumferential direction with respect to the transducing head; and a plurality of elongate ridge sections extended substantially circumferentially along the contact region, each ridge section having a circumferential length, a width in the radial direction and a height in an axial direction away from a nominal surface plane of the contact region;

wherein each of the ridge sections is substantially uniform in height over substantially its entire length and is convex in a direction facing away from the nominal surface plane; and wherein adjacent ridge sections are spaced radially apart from one another by a radial pitch greater than the radial ridge section widths by at least a factor of ten, and the ridge sections have substantially the same height, thus to determine a substantially uniform surface roughness throughout the contact region.

2. The disk of claim 1 wherein:
the ridge sections comprise parts of a single, continuous ridge in the form of a spiral, with each ridge section comprising one revolution of the spiral.

3. The disk of claim 1 wherein:
the ridge sections are substantially uniform in profiles taken through radial planes perpendicular to the nominal surface plane.

4. The disk of claim 1 wherein:
the ridge sections have heights in the range of about 5–30 nm.

5. The disk of claim 1 wherein:
said substrate body comprises an aluminum disk incorporating a nickel-phosphorous alloy layer, wherein the alloy layer provides said substantially planar surface.

6. The disk of claim 1 wherein:
said substrate body comprises a glass ceramic disk and a metallic layer applied to the disk, and wherein the metallic layer provides said substantially planar surface.

7. The disk of claim 1 wherein:
said radial ridge section widths are within a range of 1–5 microns.

8. The disk of claim 1 wherein:
said radial pitch is at least about 50 microns.

9. The disk of claim 1 further including:
a magnetic thin film recording layer applied to the substrate body and disposed over the substantially planar surface, and a metallic underlayer applied to the substrate body and disposed between the substrate body and the magnetic film recording layer.

10. The disk of claim 9 wherein:
the metallic film recording layer and the underlayer are substantially uniform in thickness and tend to replicate the topography of the substrate body.

11. A process for texturing a magnetic data storage medium, including:
directing a coherent energy beam toward a magnetic data storage medium, to cause the coherent energy beam to impinge upon a selected surface of the storage medium at an impingement area thereon, wherein the selected surface defines a nominal surface plain; and
translating the data storage medium with respect to the coherent energy beam in a manner to cause the impingement area to move along a path on the selected surface in a predetermined direction at a substantially constant speed relative to the data storage medium, locally and momentarily melting the data storage medium at the selected surface and along the path, to form a continuous, elongate ridge extending longitudinally along the path in said predetermined direction, having a transverse width, and further extending outwardly away from the nominal surface plain, wherein the elongate ridge is rounded and substantially free of sharp edges and comprises adjacent ridge sections spaced apart by a transverse pitch greater than said width by at least a factor of ten.

12. The process of claim 11 wherein:
the step of directing a coherent energy beam comprises generating a laser beam in the CW (continuous wave) mode.

13. The process of claim 11 wherein:
the data storage medium is disk shaped, and the impingement area is moved at least in part by rotating the disk, thus to define a said path as substantially circumferential.

14. The process of claim 13 further including:
translating the disk radially with respect to the coherent energy beam simultaneously with its rotation.

15. The process of claim 14 wherein:
said rotating the disk and translating the disk radially comprise forming the continuous ridge to extend circumferentially by more than 360 degrees to provide a plurality of ridge sections of the ridge spaced apart radially from one another.

16. The process of claim 15 wherein:
the continuous ridge is formed with a width in the radial direction in the range of 1–5 microns.

17. The process of claim 11 further including:
further translating the data storage medium with respect to the coherent energy beam to form a plurality of additional continuous, elongate ridges extending in the predetermined direction, and spaced apart from one another by said transverse pitch.

18. The process of claim 11 wherein:
the magnetic data storage medium comprises an aluminum disk incorporating a nickel-phosphorous layer, and said directing a coherent energy beam comprises causing the coherent energy beam to impinge upon the nickel-phosphorous layer.

19. The process of claim 18 further including:
after forming the continuous, elongate ridge, applying a magnetic thin film recording layer over the nickel-phosphorous layer.

20. The process of claim 11 wherein:
the magnetic data storage medium comprises a glass ceramic disk and a metallic layer applied to the disk, and said directing of a coherent energy beam comprises causing the coherent energy beam to impinge upon the metallic layer.

21. A magnetic data storage medium, comprising:
a non-magnetizable substrate having a substantially planar substrate surface defining a nominal surface plain, and including a selected region;
a plurality of elongate ridge sections extended longitudinally along the selected region, each ridge section having a length, a width in a transverse direction, and a height in a direction away from the nominal surface plain, wherein adjacent ridge sections are spaced apart from one another by a transverse pitch greater than the ridge section width; and
at least one thin film layer disposed over the substrate surface and defining a substantially planar outer surface including a contact region over said selected region adapted for a surface engagement with a magnetic data transducing head during accelerations and decelerations of the substrate in a predetermined direction with respect to the transducing head, said thin film layer being substantially uniform in thickness whereby the outer surface tends to replicate the substrate surface.

22. The medium of claim 21 wherein:
the ridge sections extend longitudinally in said predetermined direction.

23. The medium of claim 21 wherein:
each of the ridge sections is substantially uniform in height, and is convex in the direction away from the nominal surface plain.

24. The medium of claim 21 wherein:
the ridge sections have substantially the same height and are disposed throughout the contact region to determine a substantially uniform surface roughness throughout the contact region.

25. The medium of claim 21 wherein:

the ridge sections comprise parts of a single continuous ridge forming a spiral, with each ridge section comprising one revolution of the spiral.

26. The medium of claim 21 wherein:

said ridge section widths are in the range of 1–5 microns, and said pitch is at least about 50 microns.

27. The medium of claim 21 wherein:

The substrate is disk shaped, and the ridge sections extend circumferentially and are spaced apart from one another radially with respect to the substrate.

28. A process for texturing a substrate disk of a magnetic data storage medium, including:

providing a substrate disk having a substantially planar substrate surface defining a nominal surface plain;

directing a coherent energy beam toward the substrate disk to cause the coherent energy beam to impinge upon the substrate surface at an impingement area thereon; and translating the substrate disk with respect to the coherent energy beam in a manner to cause the impingement area to move over the substrate surface along a predetermined path, locally and momentarily melting the substrate disk at the substrate surface along the path to form a first ridge section running lengthwise along the path, having a transverse width, and extending outwardly away from the nominal surface plain, wherein the first ridge section is rounded and substantially free of sharp edges; and further translating the substrate disk with respect to the coherent energy beam to form at least one second ridge section parallel to and adjacent the first ridge section, extending outwardly away from the nominal surface plain, having a transverse width, and spaced apart from the first ridge section transversely by a transverse pitch greater than said transverse widths.

29. The process of claim 28 wherein:

the second ridge section is spaced apart from the first ridge section by a transverse pitch greater than said widths by at least a factor of ten.

30. The process of claim 28 wherein:

the first ridge section and the second ridge section are formed as part of a continuous ridge forming a spiral.

31. The process of claim 28 wherein:

said further translating the substrate disk comprises spacing the second ridge section from the first ridge section by a pitch at least ten times the width.

32. The process of claim 28 wherein:

said directing a coherent energy beam compriser operating a laser in a CW (continuous wave) mode.

\* \* \* \* \*